Figure 4:
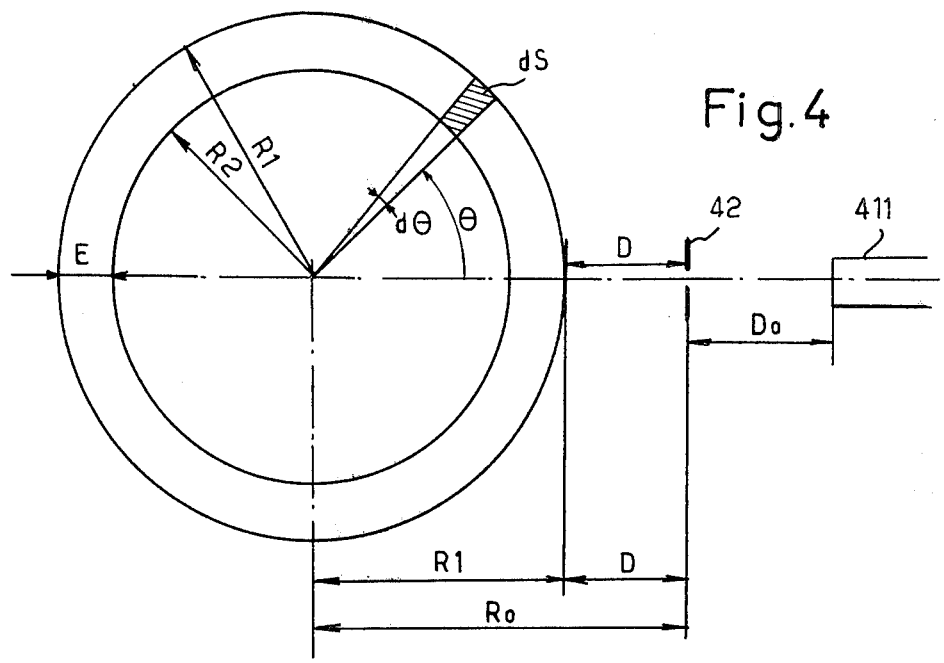

United States Patent [19]

Dory

[11] 4,114,456
[45] Sep. 19, 1978

[54] ULTRASONIC DEVICE FOR CUTTING SECTIONS OF CONSTANT WEIGHT FROM A TUBULAR BLANK

[75] Inventor: Jacques Dory, Meaux, France

[73] Assignee: CGR Ultrasonic, France

[21] Appl. No.: 798,550

[22] Filed: May 19, 1977

[30] Foreign Application Priority Data

May 21, 1976 [FR] France .............................. 76 15376

[51] Int. Cl.² .......................................... G01N 29/00
[52] U.S. Cl. .................................................. 73/622
[58] Field of Search ............. 73/67.5 R, 67.7, 67.8 R, 73/67.8 S, 609, 622, 629

[56] References Cited

U.S. PATENT DOCUMENTS

| | | | |
|---|---|---|---|
| 3,552,190 | 1/1971 | Lefebyre | 73/67.7 |
| 3,827,287 | 8/1974 | Boggs et al. | 73/67.8 S |
| 3,901,071 | 8/1975 | Hansen | 73/67.8 S |
| 3,960,006 | 1/1976 | Smith | 73/67.8 S |
| 4,027,527 | 6/1977 | Bennett et al. | 73/67.8 S |
| 4,049,954 | 9/1977 | Da Costavieira et al. | 73/67.7 |

*Primary Examiner*—Richard C. Queisser
*Assistant Examiner*—Stephen A. Kreitman
*Attorney, Agent, or Firm*—William Anthony Drucker

[57] ABSTRACT

Device for measuring the volume of sections of a tubular blank by ultrasonic echography. An ultrasonic pulse emitter-receiver is associated with an auxiliary reflector. The transducer and the auxiliary reflector are mounted on a rotary head. The blank moves forward continuously and the ultrasonic beam describes a helix on its surface. On basis of the measurement of the distances from the transducer to the outer and inner surfaces of the tube, a computer calculates the elementary areas and volumes and compares the sum of the elementary volumes with a reference value. The sections of constant weight are marked by a component controlled by the computer.

4 Claims, 5 Drawing Figures

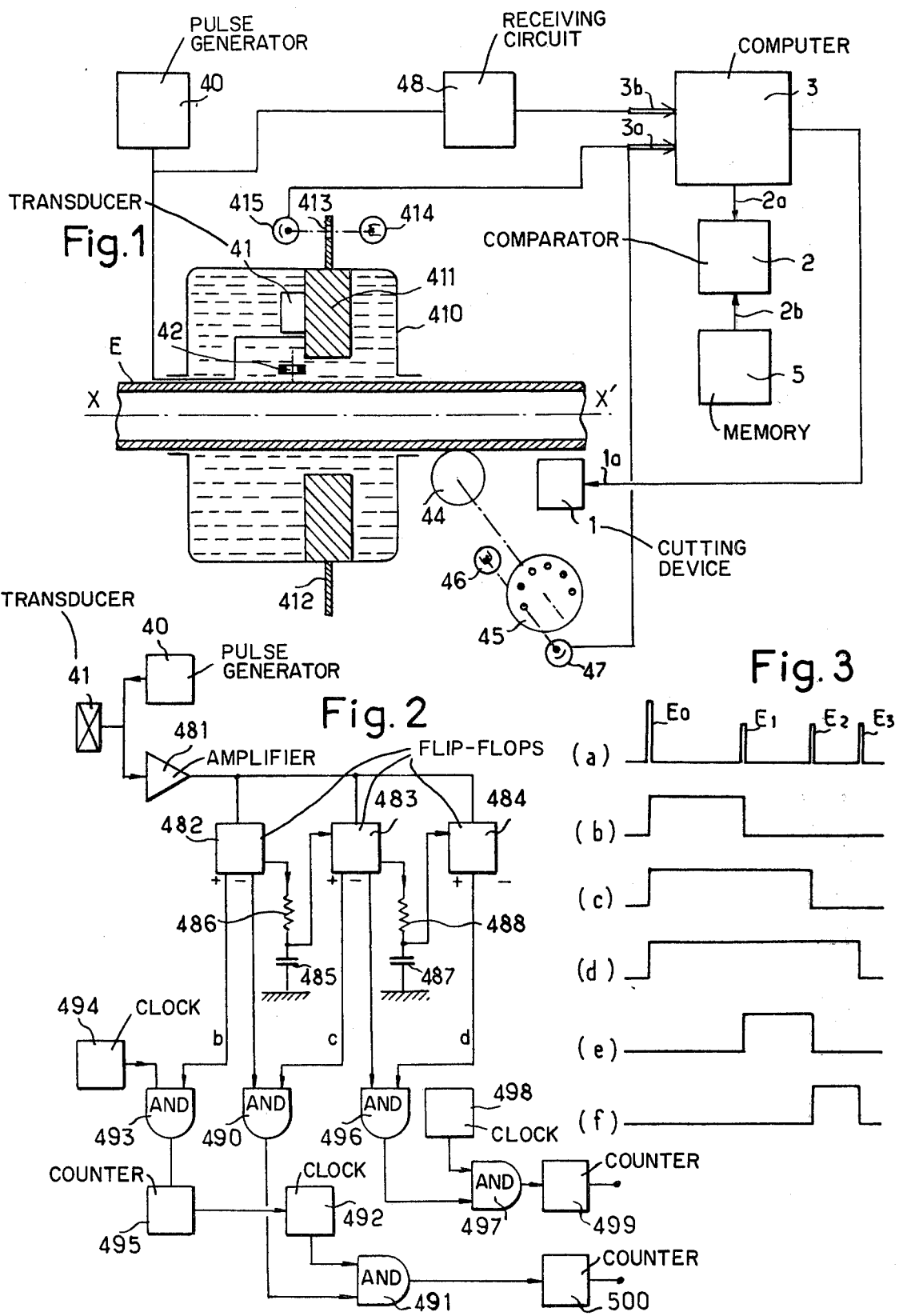

ULTRASONIC DEVICE FOR CUTTING SECTIONS OF CONSTANT WEIGHT FROM A TUBULAR BLANK

The problem of cutting out sections of tube to a strictly predetermined weight arises in particular in techniques which involve high-priced materials.

Now, while the weight of a separate part can perfectly well be measured, there are no means available of ascertaining the weight of a section which forms an integral part of a tube.

In the case of a homogeneous material, an exact knowledge of the weight of a section of a part can be deduced from a knowledge of its volume.

For a long time, a way has been known of determining the volume of parts of the most widely varying shapes by measuring the change in the level of a liquid in which the part is totally submerged, or partly submerged if it is wished to measure the volume of only a portion thereof. This method remains valid for parts which comprise hollowed-out portions providing that these are accessible to the liquid.

However, it is easy to understand that the application of such a process to a very long blank involves the use of equipment of prohibitive size and complicated handling of the product.

The specific aim of the invention is to solve this problem, regardless of the size of the blank.

According to French Pat. No. 1,545,689 filed on the 7th Aug. 1967 by the firm "Fairbanks Morse Inc." for "Device for measuring the volume of objects", a way is known of determining the volume of a moving object by measuring the dimensions of that object by means of photo-electric transducers associated with a light network traversed by the object and with a device for counting clock pulses during the time the light is intercepted by the object. The apparatus determines the elementary volumes by making a calculation on basis of the dimensions measured and totalling these elementary volumes. This apparatus could obviously not be applied to a tubular blank, not being suitable to measure the internal diameter of the tube.

Moreover, according to French Pat. No. 1,484,258, filed on the 21st June 1968 by the firm "General Dynamics Corporation" for: "Process and machine for the manufacture of articles such as tubes of the same mass", a way is known of forming sections of strip with a constant volume with a view subsequently to manufacturing tubes, by continuously measuring the thickness of the moving strip and effecting the continuous integration of the product of the section by the length. Variations in the width of the strip are considered to be negligible and the machine does not take them into account. The thickness is measured by a contact gauge. This measuring method does not make it possible to determine the volume of a tubular blank.

Continuous measurement of the thickness of the wall of a moving tube by ultrasonic echography is obviously known in itself, e.g. from U.S. Pat. No. 3,570,179 filed on the 20th June 1969 in the name of David H. Davies for: "Apparatus for automatically recording the thickness of a product and the location of defects therein". The tube moves longitudinally in front of four rotating ultrasonic transducers each of which makes a helicoidal sweep of the surface of the tube. The thickness of the tube is measured by working out the difference in the time taken for the propagation of the ultrasonic pulses to the outer and inner surfaces of the tube. This apparatus does not calculate either the areas or the elementary volumes and is relatively complicated, in particular because of the multiplicity of transducers. It should moreover be stressed that measuring the thickness of a tube is not sufficient to determine the area of its straight section.

In order to obtain an accurate determination of the increases in volume of a longitudinally-moving tubular blank in relation to a straight section reference plans, the invention proposes the use of a single transducer rotating around the axis of the submerged tube at a rate of rotation selected in terms of the rate of longitudinal advance so that the advance made during the transducer's period of rotation corresponds to a length of tubular blank in which the variation in section can be considered to be negligible, the emission of a pre-determined number of recurrent ultrasonic pulses during each period, the interval between two pulses being such that variations in the thickness of the tubular blank and its internal and external radii are negligible for an angle of rotation corresponding to said interval, the measurement of the time of propagation of each of these pulses to the outer and inner surfaces of the tubular blank, the determination on a calibrated tube of known diameter of the distance from the point of departure of the propagation to the centre of the tubular blank by a measurement of said propatation times made on the calibrated tube, the calculation, from the results of these measurements, of the elementary area of the portion of section of the tubular blank swept during each of said intervals, and the calculation of the product of the longitudinal movement of the tubular blank during each of said rotation periods by the sum of the corresponding elementary areas.

This process, in a particularly simple way, provides a very accurate determination of each elementary volume, variation of the elementary area in terms of their orientation on the section being taken into account.

According to another peculiarity of the invention, account is also taken of variations, as a function of temperature, in the rate of propagation of the ultrasonic waves in the liquid in which the transducer is submerged, by placing an auxiliary reflector in the path of the ultrasonic waves between the transducer and the tubular blank, by measuring said propagation time from the auxiliary reflector and by determining said rate of propagation by measurimg the propagation time between the transducer and the auxiliary reflector and dividing the result by the known distance between these two components.

A better understanding of the invention will be obtained from a reading of the ensuing description.

Figure 5:
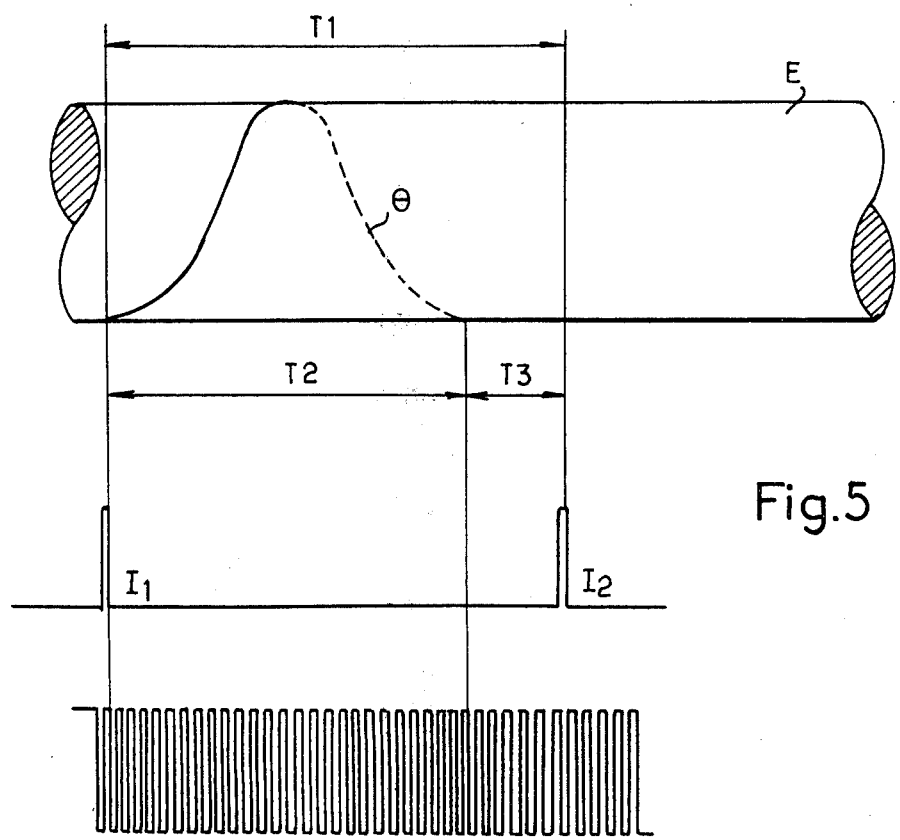

In the attached drawing:

FIG. 1 is a basic diagram of an installation for automatically cutting sections of tube of determined weight, FIG. 2 is a detailed diagram of the receiving circuits and FIGS. 3 and 5 are designed to illustrate the operation of the installation.

The automatic cutting or making device 1 comprises an automatic control input 1a coupled to the output of a computer 3. A comparator 2 has an input 2a coupled to the output of computer 3, and another input, 2b, which receives information on the reference value representing the volume of the required section, either by manual display or under the control of a pre-recorded programme in a memory 5, in particular if the sections are not identical. Possibly, comparator 2 and computer 3 can form part of a single computing unit.

Computer 3 is associated with an echographic measuring device which comprises an electric pulse transmitter 40, which excites a transducer 41; an auxiliary reflector 42, a rotary head, described below, enabling the angular movement of the unit made up of the transducer and the reflector 42, and means symbolised by a wheel 44, for moving the tube parallel to its axis XX'.

The rotary head is shown diagrammatically in the form of a casing 410 supported and rotated, by means not shown, around the tube, which crosses it axially. This casing, filled with water or other liquid transmitting ultrasonic waves, contains an annular part 411, fixed to its wall, and which supports and rotates transducer 41 and reflector 42. A disc 412, fixed to the casing and having regularly spaced peripheral perforations, such as 413, codes the angular movement of the rotary head by cooperating with a light source 414 and a photo-detector 415. The latter generates pulses whose number is in proportion to said angular movement. Wheel 44, bearing on tube E in accordance with a generating line, imparts a translatory movement to the tube at constant speed and rotates a coding wheel 45 associated with a light source 46 and with a photo-electric detector 47 which generates pulses whose number is in proportion to the axial movement of the tube.

Computer 3 comprises a first group of inputs 3a, coupled to photo-detectors 415 and 47, and a second group of inputs 3b, coupled to a receiving circuit 48, which will be described further on and is connected to transducer 41.

The first group of inputs thus receives information relating to the angular position of unit 41-42 and to the axial position of the tube.

The second group of inputs receives information relating to the outward and return propagation time of the pulses emitted and reflected successively by auxiliary reflector 42, the outer surface of the tube and its inner surface, as will be explained in detail later on with reference to FIG. 3.

Reflector 42 reflects a fraction of the ultrasonic pulse. It is made up, e.g. of a plate pierced with a hole, positioned in the axis of the beam going from probe 41 to the tube; part of the energy is reflected towards the probe, the other part goes through the hole and strikes the tube.

The rotary head briefly described above is a model commonly used for non-destructive testing or measuring the thickness of tubes by ultrasonic waves.

In FIG. 2, a preferred mode of execution of receiving circuit 48 is shown in detail. An amplifier 481 connected to transducer 42 simultaneously transmits echoes to an input triggering three flip-flops 482, 483, 484. An output of flip-flop 482 is connected to an input inhibiting flip-flop 483 via an integrating circuit comprising a resistor 486 and a capacitor 485. Similarly, an output of flip-flop 483 is connected to an input inhibiting flip-flop 484 via an integrating circuit comprising a resistor 488 and a capacitor 487. Each flip-flop has an on-line output and a complementary output. The complementary output of flip-flop 482 is connected to an input of an AND gate 490, the other input of which is connected to the on-line output of flip-flop 483. The output of gate 490 is connected to an input of an AND gate 491, the other input of which is connected to the output of a clock 492. The complementary output of flip-flop 482 is connected to an input of an AND gate 493, the other input of which is connected to a clock 494. The output of gate 493 is connected to the input of a counter 495, the output of which is connected to an input controlling the frequency of clock 492. The on-line output of flip-flop 483 and the on-line output of flip-flop 484 are connected to the respective inputs of an AND gate 496, the output of which is connected to an input of an AND gate 497. The other input of gate 497 is connected to a clock 498, and its output is connected to the input of a counter 499. A counter 500 is connected to the output of gate 491.

FIG. 3 illustrates the operation of the circuit which has just been described.

Each emission pulse Eo is followed by a first echo $E_1$ formed on reflector 42, by a second echo $E_2$ formed on the outer surface of the tube and by a third echo $E_3$ formed on the inner surface of the tube (waveform a). Flip-flop 482 is activated at $E_o$ and deactivated at $E_1$ (waveform b). Flip-flop 483 is activated at $E_o$. Echo $E_1$ cannot deactivate it because the output signal from flip-flop 482, applied after integration to the pulse input of flip-flop 483, prevents the latter from being deactivated so long as it is at 1 level. Now, this signal, because of the integration of the rear front of the output level of flip-flop 482, extends a little beyond $E_1$. Flip-flop 483 is therefore only deactivated at $E_2$ (waveform c). Similarly, flip-flop 484 is activated by $E_o$ and kept activated a little beyond $E_2$. It is therefore only deactivated by $E_3$ (waveform d).

AND gate 490 receives the complement of waveform b and waveform c. The result is that it transmits waveform e. The duration of gating pulse e is in proportion to $D/c_1$, D being the distance from reflector 42 to the outer surface of the tube (FIG. 4) and $c_1$ the speed of propagation of the ultrasonic waves in the water.

AND gate 493 receives waveform b and pulses from clock 494. The pulses transmitted during the time which gating/pulse b lasts (which is equal to $Do/c_1$, Do being the distance from transducer 41 to reflector 42) by gate 493 are counted by counter 495 which thus gives a digital signal in inverse ratio to $c_1$ (Do being a constant). This signal is used to control the frequency of the pulse emitted by clock 492. The final result is that the number of clock pulses transmitted by gate 491 while gating pulse e lasts is independent of $c_1$. Counter 500 therefore gives a digital indication of distance D. This indication is independent of variations of the speed of propagation $c_1$, of sound in water which, as is known, depends on the temperature.

AND gate 496 receives the complement of waveform c and waveform d. The result is that it transmits waveform f at its output. The time which gating pulse f lasts is in proportion to $E/c_2$, E being the thickness ($R_1 - R_2$, FIG. 4) of the tube and $c_2$ being the speed of propagation of the ultrasonic waves in the material making up the tube, which can be considered to be constant and known. Consequently, gate 497 transmits a number of clock pulses which is in proportion to E and counter 499 supplies a digital indication of this thickness.

FIG. 4 shows, diagrammatically, the end of transducer 41 pointing towards the tube, reflector 42 and a straight section of the tube.

The dimension of blank E, while they are not sufficiently constant for mere calibration of the length of the sections to be considered to be sufficient, nevertheless vary little enough in an angular sector $d\theta$ to enable them to be considered to be constant in this sector, as well as over a certain axial length $dX$.

Each angular sector $d\theta$ defines an elementary area:

$$dS = \tfrac{1}{2} d\theta (R_1^2 - R_2^2)$$

where $R_2$ and $R_1$ are a function of $\theta$.

Let $Ro$ be the distance from the auxiliary reflector to the median axis of the tube, which is also the axis of rotation of the transducer, and D the distance from the tube to the auxiliary reflector. We then have:

$$dS = \tfrac{1}{2} d\theta (R_1^2 - R_2^2) = \tfrac{1}{2} d\theta (E + 2D - 2Ro)E$$

We have seen above that circuit 48 sends the computer digital signals in proportion to D and to E. Moreover, it is easy to ascertain $Ro$ by taking a perfectly calibrated standard tube of known diameter 2 $R_1$ and measuring, by means of the instrument and ascertaining the same propagation times, the constant distance D from reflector 42 to the outer surface of this tube. The instrument's computer is set to work out the sum $R_1 + D = Ro$. The computer can then calculate dS corresponding to a given value of $d\theta$ from the $Ro$, D and E values.

This computer will merely have to comprise elementary arithmetical circuits (algebraic additions and multiplications).

The calculations to be made are defined by the following succession of operations:
(i) calculation of $dS = (d\theta/2)(E + d - 2Ro)E$, $d\theta$ being the angle through which the head has turned during the interval between two successive ultrasonic pulses (ii) calculation of the sum of terms $dS$ for $n$ successive transducer positions, e.g. 64, distributed evenly around the axis, $d\theta$ this being equal to $2\pi/n$, i.e. $(\pi/n) \times \Sigma (E + 2D - 2Ro)E$.

While the transducer occupies these 64 successive angular positions, i.e. while the rotary head goes through a complete rotation, the tube moves forward over a certain axial distance and the speed of rotation is calculated, in relation to the speed of forward movement, so that this axial forward movement corresponds to a short enough length to allow the variation of the section of the tube over this length to be disregarded. On the other hand, variations in the thickness of the tube and its inner and outer radii in terms of $\theta$ are taken into account in the above calculation. They are only disregarded in the very small angular interval $d\theta$. Experience shows that, in fact, variations in the shape of the tube in the same straight section are much greater than variations in the section in the axial direction.

In FIG. 5, $I_1$ and $I_2$ represent two successive translatory pulses whose period is $T_1$ coming from detector 47 (FIG. 1) and the times are shown in abscissa along the axis of the blank. $T_2$ represents the time of a full rotation of the rotary head. The instrument is set so that the forward movement pulse $I_1$, is followed, in the time interval $T_2$, shorter than $T_1$, by $n$ ultrasonic pulses ($n = 64$ in the aforementioned example, a smaller number being shown to make the figure clearer) emitted with the head in angular positions differing successively by $d\theta = (2\pi/n)$.

At each pulse, as has been explained above, a measurement of D and E and a calculation of the elementary area $dS$ is made. Although the elementary area measured at the next pulse does not belong to the same straight section of the tube, it can be considered, in view of the foregoing remarks, that the elementary volume of a section whose length is $dX$ (equal e.g. to 1 cm) defined by pulses $I_1$ and $I_2$ is:

$$dV = (\pi/n) \cdot dx \cdot \Sigma(E + 2D - 2Ro)E$$

For a predetermined volume $Vo$, the number P of elementary lengths $dx$ is defined by:

$$Vo = \frac{\pi}{n} dx \, \Sigma_1^P (E + 2D - 2Ro)E$$

Lengths $dX$ are chosen short enough for the error due to quantification ($Vo$ not necessarily being equal to a whole number of elementary volumes) to be below the required accuracy.

Each calculation of $dS$ is made between two successive ultrasonic pulses.

During the remaining time $T3 = T1 - T2$, the computer works out the sum of the elementary areas, and the corresponding volume which is compared at 2 with the reference value $Vo$ to control the cutting or making device. The latter is of a type known in itself. It will be noted that with a rapide computer, interval T3 is not necessary.

In order to reduce calculation time T3, the reference volume $Vo$ is divided by the value of the forward step $dX$, which defines a reference area $So$, with $So = Vo/dX$; during time T3, the computer then only has to carry out a simple addition of $n$ terms, which the comparator 2 compares with $So$.

In all the foregoing, only the reference volume has been taken into account, the weight being deduced from it simply from the density, which is assumed to be constant when the device is used for the determination of sections of determined weight.

$So$ is then replaced by $S'o = So = (Po/d \, dX)$ where $Po$ is the reference weight, $d$ the density.

I claim:
1. An apparatus for the accurate determination of the increase in volume of a longitudinally moving tubular body in relation to a straight section reference plane, said apparatus comprising a single transducer adjusted to emit and receive ultrasonic pulses along a path directed towards the axis of the tubular body, means for exciting this transducer at a specific pulse period, means for rotating the transducer around the axis of the tubular body at a specific rotation period, a reflector integral with the rotation of the transducer and adjusted partly to reflect the ultrasonic pulses on said path, means for generating digital signals representing the relative angular position and longitudinal position of the tubular body and the transducer, pulse receiver circuit means connected to said transducer and calculating means connected to said means for generating digital signals and to said pulse receiver circuit means, said pulse receiver circuit means comprising means for generating first, second and third gating signals whose durations are in proportion to the propagation times of the said ultrasonic pulses from the transducer to the reflector and to the outer and inner surfaces of the tubular body respectively and means for generating, from the said first, second and third gating signals, first and second further digital signals representing the distance from the reflector to the said outer surface and to the thickness of the tubular body, respectively; the calculating means being adapted to calculate, from the said first and second further digital signals, the elementary area of the angular portion of the straight section of the tubular body which is swept by the said path during the said pulse period and the sum of the said elementary areas during the said rotation period.

2. An apparatus according to claim 1 wherein the said means for generating digital signals are adjusted to generate electric pulses having a period which defines a length of tubular body greater than the longitudinal movement effected during said rotation period, the calculating means being adjusted to calculate the said elementary areas during the rotation period and the said sum during the rest of the period of the said electric pulses.

3. An apparatus as claimed in claim 1, wherein the said means for generating the first and second further said digital signals comprise means for generating fourth gating signal whose duration is the difference between the durations of the second and first gating signals; means for generating fifth gating signal whose duration is the difference between the durations of the third and second gating signals; first clock pulse generating means for generating first clock pulses and first counting means for counting the said first clock pulses during the said first gating signal; second clock pulse generating means for generating second clock pulses, said second clock pulse generating means having a frequency control input which is connected to the said first counting means; third counting means for counting the second clock pulses during the fourth gating signal to provide the first further digital signal; means for generating third clock pulses and means for counting the said third clock pulses during the said fifth gating signal to provide the second further digital signal.

4. An apparatus as claimed in claim 1, wherein the calculating means is further adapted to calculate the sum of the distance from the reflector to the outer surface of a reference tubular body of known radius and of the said radius.

* * * * *